United States Patent
Richter et al.

(10) Patent No.: US 9,160,817 B2
(45) Date of Patent: *Oct. 13, 2015

(54) PAGE SERVER FOR NAVIGATION DATA

(71) Applicant: Navteq B.V., Veldhoven (NL)

(72) Inventors: Jan Richter, Idstein (DE); Martin Pfeifle, Seewald (DE); Christof Kaiser, Eindhoven (NL); Peter Skvarenina, Frankfurt (DE); Alexander Barthel, Bad Camberg (DE)

(73) Assignee: HERE Global B.V., Veldhoven (NL)

( * ) Notice: Subject to any disclaimer, the term of this patent is extended or adjusted under 35 U.S.C. 154(b) by 9 days.

This patent is subject to a terminal disclaimer.

(21) Appl. No.: 14/025,439

(22) Filed: Sep. 12, 2013

(65) Prior Publication Data

US 2014/0025731 A1    Jan. 23, 2014

Related U.S. Application Data

(63) Continuation of application No. 13/195,974, filed on Aug. 2, 2011, now Pat. No. 8,566,346.

(60) Provisional application No. 61/371,191, filed on Aug. 6, 2010.

(51) Int. Cl.
*G06F 7/00* (2006.01)
*G06F 17/30* (2006.01)
*H04L 29/06* (2006.01)
*G01C 21/32* (2006.01)

(52) U.S. Cl.
CPC ............... *H04L 67/42* (2013.01); *G01C 21/32* (2013.01); *G06F 17/30241* (2013.01)

(58) Field of Classification Search
None
See application file for complete search history.

(56) References Cited

U.S. PATENT DOCUMENTS

| | | | |
|---|---|---|---|
| 5,758,342 A | 5/1998 | Gregerson | |
| 5,893,113 A * | 4/1999 | McGrath et al. | 701/23 |
| 6,018,695 A * | 1/2000 | Ahrens et al. | 701/532 |
| 6,691,128 B2 | 2/2004 | Natesan et al. | |
| 8,365,188 B2 | 1/2013 | Goldspink et al. | |
| 2003/0217081 A1 | 11/2003 | White et al. | |
| 2005/0039168 A1 | 2/2005 | Applin | |
| 2007/0143672 A1 | 6/2007 | Lipton et al. | |
| 2010/0023531 A1 | 1/2010 | Brisebois et al. | |
| 2010/0100585 A1 | 4/2010 | Guney et al. | |
| 2010/0131584 A1 | 5/2010 | Johnson | |

OTHER PUBLICATIONS

Newell et al., Technical Paper No. 8-GIS Databases are Different, Aug. 28, 2006, 11 pages, http://www.geo.hunter.cuny.edu/aierulli/gis2/abstracts/paper/technical_paper_8.pdf.

Small World Datastore, accessed Jul. 29, 2011, http://www.evu-gis.de/sw-dokumentation-91.htm.

VMDS—Wikipedia, accessed Jul. 29, 2011, http://en.wikipedia.org.wiki/VDMA.

* cited by examiner

*Primary Examiner* — Uyen Le
(74) *Attorney, Agent, or Firm* — Lempia Summerfield Katz LLC

(57) ABSTRACT

A page server and method of using the page server is described. The page server stores versioned pages. The pages, which are equally sized data chunks, can be stored with identifiers and version data in a relational database, in separate files, or in a single file where pages are concatenated. The page server may be accessed via SQL, a web interface, a proprietary key/value/version interface on top of TCP/IP, or other method. The page server facilitates incremental updates.

18 Claims, 6 Drawing Sheets

PAGE SERVER FOR NAVIGATION DATA

REFERENCE TO RELATED APPLICATIONS

This application is a continuation under 37 C.F.R. §1.53(b) and 35 U.S.C. §120 of U.S. patent application Ser. No. 13/195,974 filed Aug. 2, 2011, which claims the benefit of U.S. Provisional Patent Application No. 61/371,191 filed Aug. 6, 2010 and entitled "PAGE SERVER FOR NAVIGATION DATA." The full disclosure of U.S. patent application Ser. No. 13/195,974 and U.S. Provisional Patent Application Ser. No. 61/371,191 are incorporated herein by reference.

FIELD

The present invention relates generally to digital map data, and more particularly, relates to using a page server to update and version database pages containing digital map data.

BACKGROUND

A navigation application reads data from a geographic database. The data may be next valid character tree (NVC) data, spatial index data, full text search data, data for map rendering or routing, 3D data, traffic message channel (TMC) data, point of interest (POI) data, or general metadata. The data may be stored in different data structures that are designed for their use within the navigation application. For example, the navigation database standard (NDS) specifies storing POI data in a relational way and storing data for routing and map display in binary large objects (BLOBs).

The geographic database may be located on a client device, such as a navigation system. However, the client database may have data that is out-of-date. To obtain current data, the client device may request data from an up-to-date server database. To synchronize the data between an up-to-date server database and an out-of-date client database, synchronization techniques are needed for all of the different data structures. Moreover, the data structures may have special version items that require special treatment.

Despite the different data structures, the navigation application typically reads data from the database file in equally sized pages. The pages are created by a database system without regard to which applications will be using the pages. Moreover, the database system decides which pages to read in what order to provide the relevant content to the navigation application.

SUMMARY

A method and system for serving navigational data as versioned pages without knowing their detailed content is disclosed. The approach has the advantage that it is generally usable and that all kinds of navigational data structures can be modeled on top of it. Not only can this approach be used for incremental map update, but also for hybrid navigational applications. Furthermore, the presented approach is not limited to synchronizing, versioning, and updating navigational databases, but may also be used for other embedded databases.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein.

DETAILED DESCRIPTION

A page server facilitates the updating and versioning of database pages, instead of versioning and updating navigational features. The database pages are stored on the page server, and client applications can access these pages and store them locally.

Figure 1:
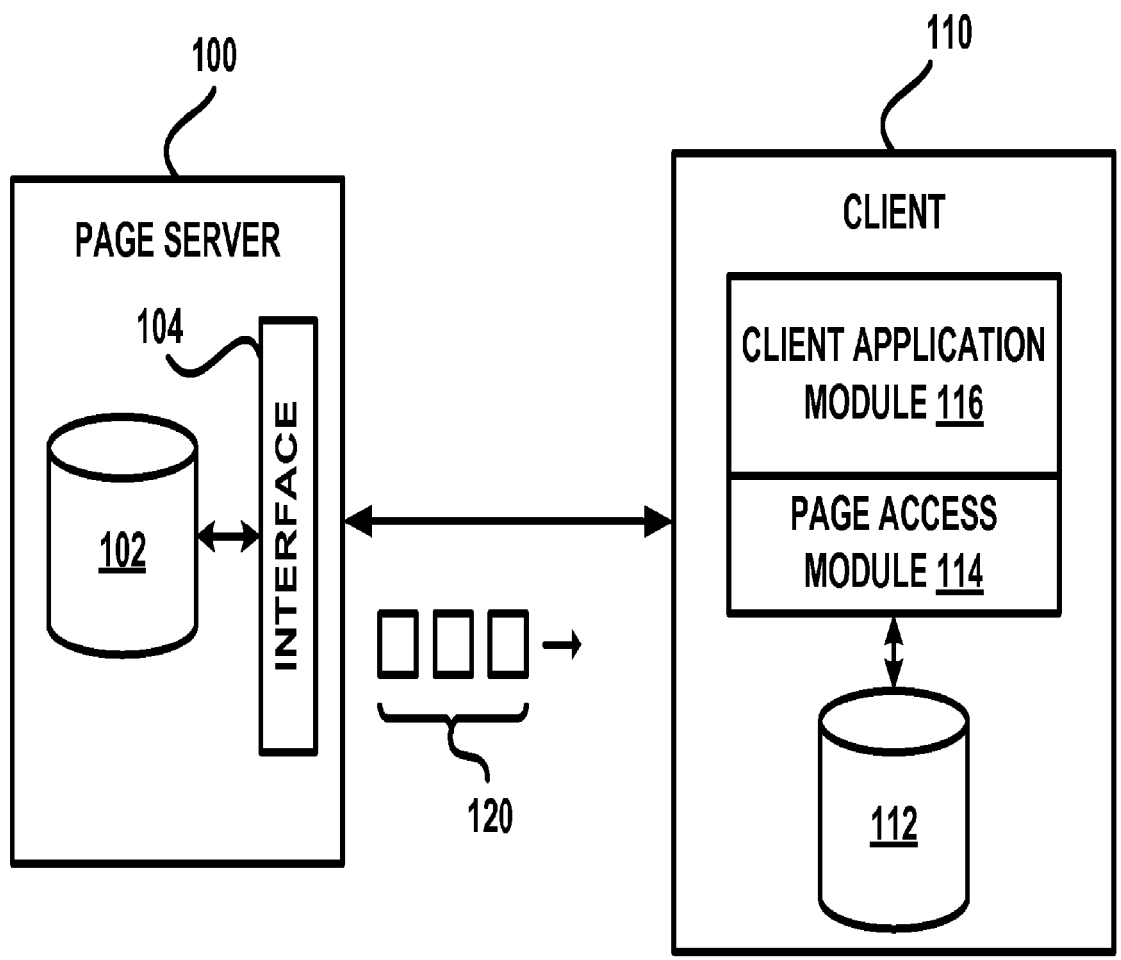
FIG. 1 is a block diagram of a page server communicating with a client, according to an example.

FIG. 1 is a block diagram of a page server 100 communicating with a client 110. The page server 100 and the client 110 may communicate, for example, via SQL, a web interface, and/or a proprietary key/value/version interface on top of TCP/IP.

The page server 100 includes a server database 102 and a server interface 104. The client 110 includes a client database 112, a page access module 114, and a client application module 116. Data in the server database 102 is typically more current than the data in the client database 112.

The page server 100 stores pages of data in the server database 102. The pages are equally sized data chunks. Additionally or alternatively, the page server 100 stores a binary difference between a current page and the previous version of the current page in the server database 102. The page server 100 may also store compressed pages and/or differences in the server database 102. In some applications, it may be beneficial to use a rather large page size (e.g., 32 Kbytes) to reduce the number of page requests.

The server database 102 may be a relational database, which allows for easy query and page updates. The data in the server database 102 may be split into different tables allowing the page server 100 to retrieve pages based on SQL. As another example, the pages may be stored in the server database 102 as flat files. As yet another example, the pages may be concatenated and stored within a single file. Additionally, the pages may be stored in the server database 102 in a proprietary manner. Obviously, the pages can be stored in many suitable ways.

The server interface 104 may be implemented in many ways, such as a commercially available database system or a proprietary database system implementation. For example, the server interface 104 may be based on SQL. In this example, SQL commands may be issued via database specific jdbc or native modules, e.g., for Oracle OCI. As another example, the SQL commands may be issued via streamed SQL (http://en.wikipedia.org/wiki/StreamSQL). The server interface 104 may also be implemented as a RESTinterface (http://en.wikipedia.org/wiki/Representational_State_Transfer). As yet another example, the server interface 104 may be implemented as a specific protocol on top of TCP/IP. Other implementation methods are also possible.

The client 110 may be a navigation system located in a vehicle, a personal navigation device, or a mobile telephone. In this example, the client application module 116 includes hardware and/or software for providing navigation functions, such as route calculation, route guidance, and map display. Alternatively, the client 110 may be another server or a computer that uses and/or processes navigation data. For example, the client application module 116 may include hardware and/or software for compiling navigation data in one or more formats. The client 110 may also be another system that uses an embedded database, such as a music player.

The page access module 114 determines whether to read data from the client database 112 or from the page server 100. The page access module 114 also allows the client 110 to write pages from the page server 100 into the client database 112. In one example, the page access module 114 is a virtual file system layer. In the case of the Navigation Database Standard (NDS), the page access module 114 is implemented as an SQLite virtual file system (http://www.sqlite.org/c3ref/vfs.html).

The communication between the page server 100 and the client 110 is described in a simplified manner as follows. The server interface 104 receives page requests from the page access module 114. The server interface 104 responds to the page requests by retrieving pages from the server database 102. The server interface 104 transmits pages 120 to the page access module 114. In response, the page access module 114 stores the pages 120 in the client database 112 and/or provides the pages 120 in the client application module 116.

Figure 2:
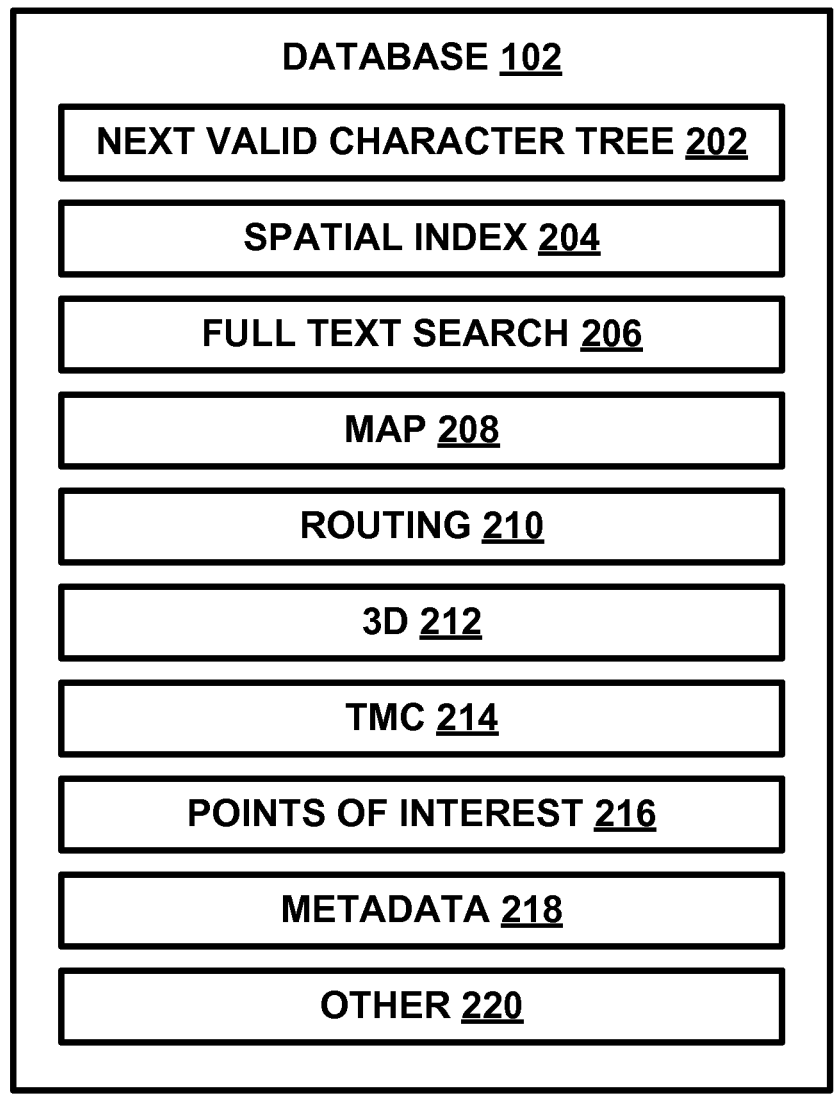
FIG. 2 is a block diagram of data within a database associated with the page server depicted in FIG. 1, according to an example.

FIG. 2 is a block diagram of data that may be stored in the server database 102. As seen in FIG. 2, the server database 102 includes a variety of data types. However, as this is not an exhaustive list of all the data types that may be stored in the server database 102, FIG. 2 depicts other data 220.

The server database 102 depicted in FIG. 2 includes data that may be used by a navigation system. However, the page server 100 may be used to synchronize and update data for all kinds of embedded databases. For example, the server database 102 may include data regarding music, books, movies, contact lists, and so on. Thus, the server database 102 is not limited to storing navigation related data.

The server database 102 may include Next Valid Character Tree (NVC) data 202. The NVC data 202 may be composed of small BLOBs (binary large objects), which contain the next possible characters in a destination input and references to the next NVC BLOB.

The server database 102 may also include spatial index data 204. The spatial index data 204 may include various types of indexes that relate the different types of data to each other. For example, the spatial index structure may be an R-tree data structure, which allows for indexing multi-dimensional information, for example, the coordinates of geographical data.

The server database 102 may also include full text search data 206. Full-text search denotes a technique for searching computer-stored documents. The user supplies search strings and a search engine uses these search strings to match them with the words in documents. For example, the full-text search data 206 may consist of an n-to-m relation between the search strings and the documents. For a given query, the full-text search library typically returns all document IDs that contain the terms supplied in the query.

The server database 102 may also include map data 208. The map data 208 includes information regarding point, line, and area features. Point features are used for rendering single points on a map. Line features are used for rendering lines on a map. Area features are used for rendering area shapes on a map.

The server database 102 may also include routing data 210. The routing data 210 includes a digital representation of the road network, including road geometry information, such as curvature, road width, and slope. The routing data 210 may be organized into building blocks to facilitate routing, map matching, route guidance, and advanced driver assistance (ADAS) applications. For example, the routing data 210 of a certain region may be stored in a BLOB, while geometry and guidance information may be stored in other BLOBs.

The server database 102 may also include 3D data 212. The 3D data 212 may include three-dimensional models of real world objects, a digital representation of ground surface topography or terrain, and/or satellite and aerial images of the surface.

The server database 102 may also include Traffic Message Channel (TMC) data 214. The TMC data 214 is transmitted via the Radio Data System (RDS), a digital sub-channel of standard Frequency Modulation (FM) radio broadcast. The TMC data 214 includes predefined location codes and event codes. The event information describes the reason (for example, accident) and/or effect (for example, traffic jam) of a traffic message. The event code is transmitted in a TMC message and refers to the coded location.

The server database 102 may also include points of interest (POI) data 216. The POI data 216 may include point of interest records comprising a type (e.g., restaurant, hotel, city hall, police station, historical marker, ATM, golf course, and so on), location of the point of interest, a phone number, hours of operation, and so on. The POI data 216 may be stored in various relations. One relation may contain category and position of the POI. Another relation may contain more detailed information, such as URLs or names of the POIs.

The server database 102 may also include metadata 218. The metadata 218 includes information on variable database content and database properties. The metadata 218 may be associated with a specific product database, a building block, or the complete database.

Per the navigation database standard (NDS), the data 202-220 in the server database 102 are stored in an embedded relational database, such as SQLite (http://www.sqlite.org/). The different data structures (e.g., for NVC data 202, spatial index data 204, . . . , metadata 218) are stored in relations within SQLite and versioned using a version column. Some of the versioned items may be large (e.g., more than 1 MByte for a routing BLOB), while others may be small (e.g., less than 100 Byte for an NVC BLOB). Furthermore, there may be non-versioned items, such as metadata or some POI attributes, which might not be in sync with the versioned data. Due to the complexity of the various data structures, it is difficult to create a version concept on top of the SQL columns. To overcome the difficulties of versioning by data type, the page server 100 versions by page.

Figure 3:
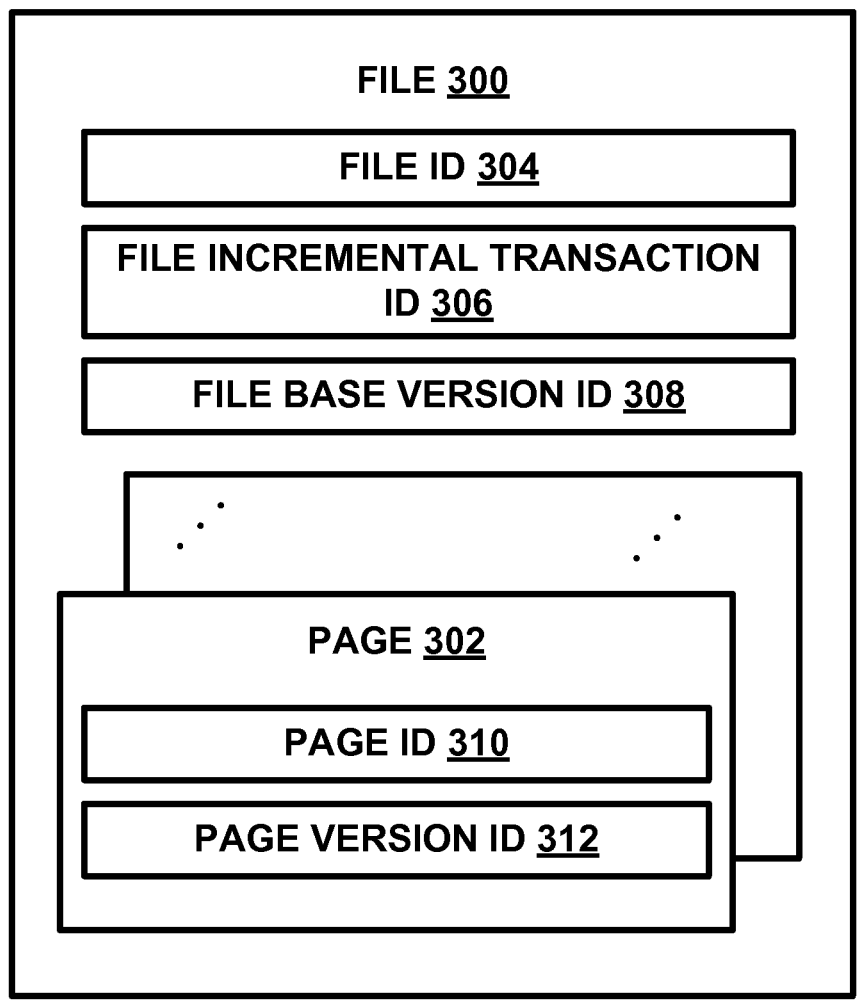
FIG. 3 is a block diagram of a file containing multiple pages, according to an example.

FIG. 3 depicts a file 300 that includes multiple pages 302. A page is a generic data container that can hold many different types of data (e.g., metadata 218, index data 204, full text search data 206, . . . ). Each page 302 has its own version number and the file 300 has the highest version number of all its pages.

The file 300 is associated with a file identifier 304, a file incremental transaction identifier 306, and optionally a file base version identifier 308. The file ID 304 describes the content stored in the file 300. For example, FileID 1 may represent routing data from Germany, FileID 2 may represent routing data from France, File ID 1000 may represent name data from Germany, and FileID 10000 may represent metadata of the Europe Database.

The file incremental transaction ID 306 is set to one (or other starting point) when the file 300 is created. If the file 300 is incrementally changed (i.e., a page is updated or added), the FileIncrementalTransactionID is increased. An incremental compiler may be used to change the file incremental transaction ID 306.

The file base version ID 308 describes when the file 300 was originally created. For example, a map developer may release new products periodically, e.g., every quarter, based on new raw data releases. The FileBaseVersionID is increased every time the file 300 is built from scratch. While the file base version ID 308 may be beneficial for navigation systems, this identifier may not be necessary in other systems that use an embedded database.

The page 302 is associated with a page identifier 310 and a page version identifier 312. The page ID 310 identifies the page 302 within the file 300. The file 300 is logically divided into equally sized pages 302. Each page 302 can be accessed directly. For example, a file of size 1 GByte having a page size of 1 Kbyte consists of one million pages.

The page version ID 312 is increased every time the page 302 is updated within a transaction. Assume within FileIncrementalTransactionID 2, page n is changed and, within FileIncrementalTransactionID 3, page m is changed; then page n has the PageVersionID 2 and page m has the PageVersionID 3, whereas all other pages have the PageVersionID 1. Note that the FileIncrementalTransactionID is 3, which equals the maximum PageVersionID in the file.

The server interface 104 uses some or all of the parameters 304-312 for storing and retrieving versioned pages 302. For example, the server interface 104 may retrieve from the server database 102 all pages of a certain FileID 304 and FileBaseVersionID 308, where the PageID 310 is greater than a certain FileIncrementalTransactionID 306 of the client database 112. As another example, the server interface 104 may update a page 302 in the server database 102 identified by its FileID 304, FileBaseVersionID 308, and PageID 310. In this example, the PageVersionID 312 and the FileIncrementalTransactionID 306 are increased on the page server 100. Other functions are also possible.

Figure 4:
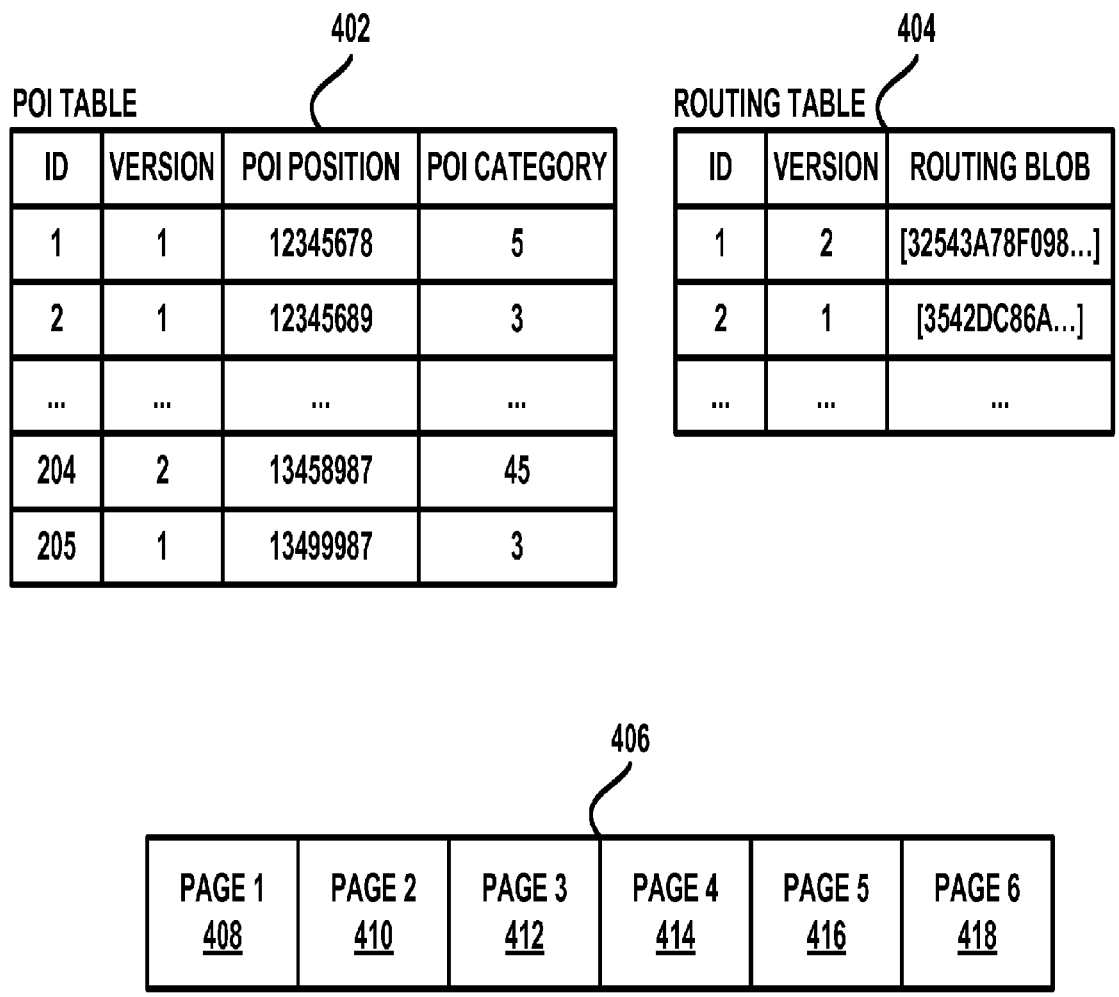
FIG. 4 is a block diagram depicting how the file in FIG. 3 is versioned, according to an example.

FIG. 4 depicts a POI table 402 and a routing table 404, which contain data that may be stored in a database file 406 in the server database 102. The tables 402, 404 contain versioned data. For example, the POI associated with ID 204 has been modified once (version 2), while the other POI data is still in their original state (version 1). Similarly, the routing BLOB associated with ID 1 has been modified once (version 2), while the routing BLOB associated with ID 2 has not been modified (version 1).

The file 406 has six pages 408-418. The second page 410 includes data for the POI associated with ID 204. The fourth and fifth pages 414, 416 include part of the routing BLOB associated with ID 1. The file 406 starts with version ID 1 (original).

In this example, the file 406 is modified as follows. When the POI associated with the ID 204 is updated, the second page 410 needs to be updated. The second page 410 is completely rewritten and assigned the version ID 2 (first revision to the file 406). In comparison, the first page 408, which contains POIs with smaller IDs, is not rewritten and still has the version ID 1. Note that a page can contain the content of several POIs.

In the next transaction, the routing BLOB with the ID 1 is updated. In order to perform this update, the fourth and fifth pages 414, 416 need to be rewritten. Their new page version number is equal to maximum page version number in the file+1, in our example 3. The fifth page 416 may also contain some data of the non-updated routing BLOB associated with ID 2. The data of the routing BLOB associated with ID 2 is spread over two pages, i.e., the fifth and sixth pages 416, 418, where the fifth page has version ID 3 and the sixth page has version ID 1.

Note that if the POI associated with ID 204 and the routing BLOB associated with ID 1 are updated in a single transaction, the second, fourth, and fifth pages, 410, 414, 416 would have version ID 2, while the first, third, and sixth pages 408, 412, 418 would have version ID 1. Thus, the page version number reflects the transaction ID. Stated another way, the page version number is identical to the last transaction ID in which the page was changed.

While FIG. 4 depicts versions in the tables 402, 404, this versioning is not necessary when using page versioning. Updating and synchronizing a navigational database based on versioned pages rather than on the versioned navigational objects is simpler, more efficient, more reliable, more usable, and can be implemented more conveniently. Moreover, the page version handling is done in a transparent way to the application.

Figure 5:
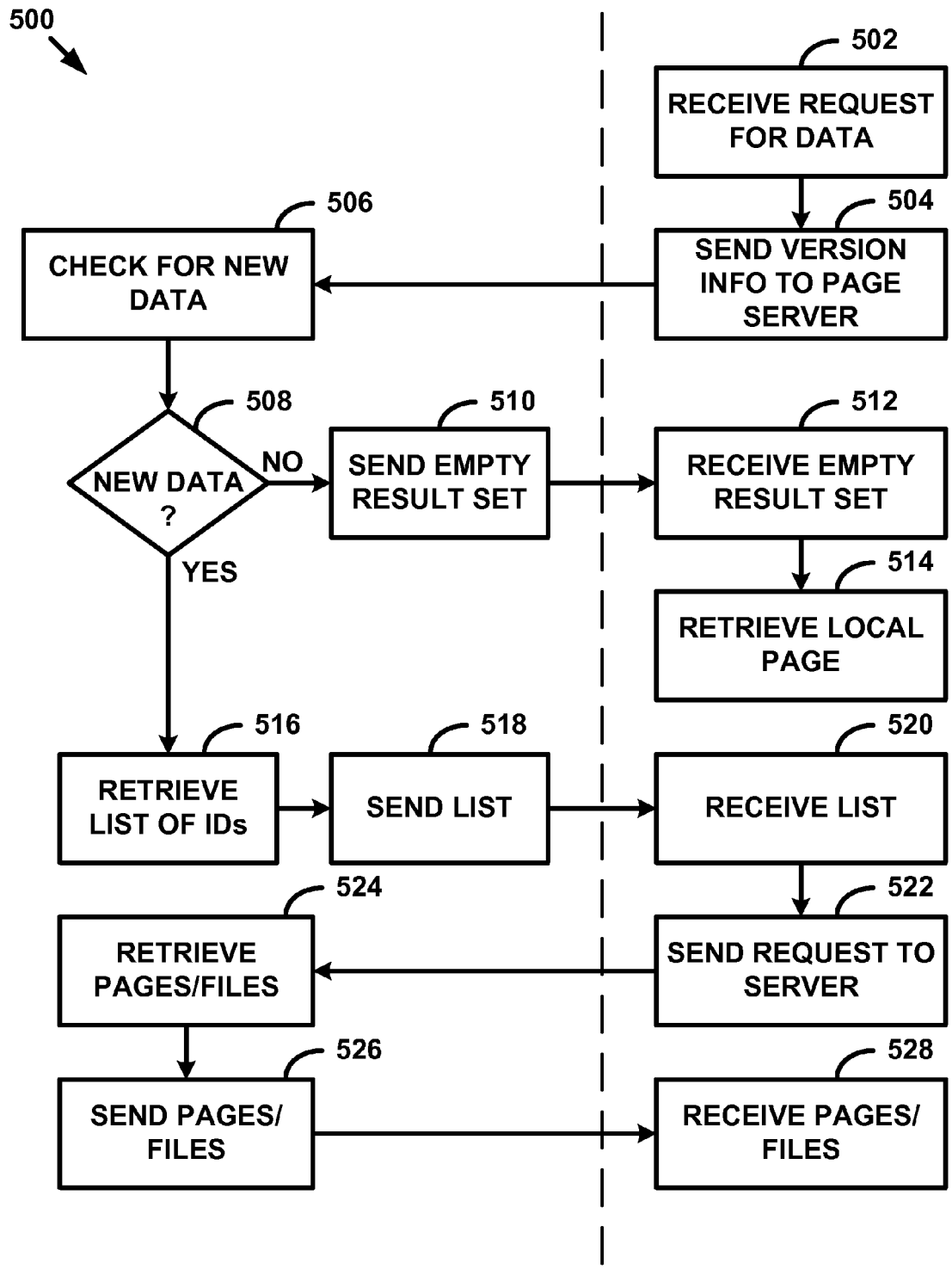
FIG. 5 is a flow chart of a method for using the page server depicted in FIG. 1, according to an example.

FIG. 5 is a flow chart of a method 500 for using the page server 100 for an incremental map update. A dashed line is shown separating the left side of the flow chart from the right side of the flow chart. In this example, actions that occur on the left side of the flow chart are performed by the page server 100 and actions that occur on the right side of the flow chart are performed by the client 110.

At block 502, the client 502 receives a request for data. For example, a navigation system may request map data for route calculation, route guidance, and/or map display. While a navigation application is running, several SQL commands are carried out, such as: SELECT*FROM routingTileTable WHERE id=23423. Using an underlying SQLite library (www.sqlite.org/arch.html), the page access module 114 transforms the SQL commands into a set of page requests.

The client 110 may have access to more than one navigation database file stored in the client database 112. For example, the client 110 may have access to a first file containing data of France and a second file containing data of Germany as shown in Table 1.

TABLE 1

| Database | File ID | File Version ID | File Transaction ID | URL |
|---|---|---|---|---|
| Germany | G1 | 1 | 0 | ./data/Germany.nds |
| France | F1 | 1 | 0 | ./data/France.nds |

To open a file in the client database 112, the client 110 passes at least the URL for the local file, e.g., "./data/Germany.nds" to the page access module 114. The FileID 304, the FileIncrementalTransactionID 306, and the FileBaseVersionID 308 may be contained directly in the file (e.g., in the first 100 Bytes of an SQLite file), in a look-aside file (e.g., ./data/Germany_FileInfo.nds), or passed along with the URL within the open procedure.

The virtual file system implementation of the page access module 114 now has all information needed to either request pages from the page server 100 or from the local database 112. Note that the page size and the number of pages are typically stored in the client database 112 (e.g., in the first 100 bytes of an SQLite file). If the page size and the number of pages are not stored in the local database file, this information may be stored in a FileInfo file or retrieved from the page server 100.

At block 504, the page access module 114 sends client version information to the page server 100. The client version information includes the FileID 304, FileIncrementalTransactionID 306, and FileBaseVersionID 308. The client version information also includes a query regarding whether pages with higher PageVersionIDs or newer file versions are available. In some scenarios, the client version information is only sent if an application requests data that is not available on the client database 112.

At block 506, the server interface 104 receives the information from the page access module 114 and checks whether updated pages and/or files are available based on the values of FileIncrementalTransactionID 306 and FileBaseVersionID 308 for the FileID 304. At block 508, the server interface 104 determines whether new data exists.

At block 510, if the file associated with the FileID 304 has not been updated on the server database 102, the server interface 104 returns an empty result set to the page access module 114. At block 512, the page access module 114 receives the empty result set. At block 514, the page access module 114 retrieves a page from the local database 112.

Returning to block 508, if new data is available, at block 516, the server interface 104 retrieves a list of PageIDs 310 of pages that have been updated along with the newest FileIncrementalTransactionID 306 from the server database 102. At block 518, the server interface 104 sends the list of PageIDs 310 of pages that have been updated along with the newest FileIncrementalTransactionID 306 to the page access module 114. By receiving a list of outdated pages, the client 110 may work in a "lazy" mode requesting the content of the updated pages only when the content is needed by an application. In another example, the server interface 104 may immediately retrieve and send the updated pages to the page access module 114 as described at blocks 524-526.

At block 520, the page access module 114 receives the list of PageIDs 310 of pages that have been updated along with the newest FileIncrementalTransactionID 306. The page access module 114 marks the pages associated with the listed IDs as outdated. The information regarding the outdated pages may be stored in the client database 112, in a look-aside file, or any other suitable data structure, such as an SQLite file. If there is a newer FileBaseVersionID 308, the client application module 116 may determine whether it wants to continue using the file associated with the older FileBaseVersionID and download only updated pages associated with the older FileBaseVersionID, or whether it wants to download the complete file, i.e., all of the pages associated with the newer FileBaseVersionID.

At block 522, the page access module 114 sends a request for downloading the new pages and/or files from the server database 102. If the client application module 116 decides to download the complete file, all pages associated with the newer FileBaseVersionID are requested. If the client application module 116 decides to download just the updated pages, the updated pages are requested.

At block 524, the server interface 104 receives the request for pages and/or files. The server interface 104 retrieves the requested pages and/or files from the server database 102. At block 526, the server interface 104 sends the pages and/or files to the page access module 114.

At block 528, the page access module 114 receives the pages and/or files from the server interface 114. If the page access module 114 receives all of the pages associated with the newer FileBaseVersionID, the page access module 114 deletes the older file from the client database 112 and stores the newer file.

If the page access module 114 receives another request for data, the page access module 114 determines whether one of the downloaded pages in the look-aside file is available. If it is, the page is passed to the higher levels of the SQLite engine and is incorporated into the client database 112. If the file is closed and not all downloaded pages have been incorporated, then at the next opening of the file, before the page server 100 is contacted for newer information, the pages are incorporated into the file and the local FileIncrementalTransactionID is increased. This approach is similar to the write-ahead-locking approach implemented in SQLite. Thereafter, the FileID, FileBaseVersionID, and the new FileIncrementalTransactionID are sent to the page server 100 again and the method 500 continues at block 506.

Note that the download of the newer pages could also start as a background routine, without waiting for an application request for an outdated page. The pages should only be passed to the upper levels of SQLite if all pages are successfully stored in the client database 112. Only then can it be guaranteed that the client application module 116 has a consistent version of the data even when no online connection is available.

The size of the SQL-result set typically corresponds to the number of read pages. For example, if a navigation application reads a routing BLOB, only a few index pages and the pages where the routing BLOB is stored are read. As another example, if the navigation application does non-index supported queries or uses an aggregation function (e.g., count( )), then all pages of the database may be read, although the result set may consist of only one record. As navigation systems typically do not require these aggregate functions and non-index based reads, the amount of read data correlates to the number of read pages. Similarly, if the page access module 114 updates the client database 112 via an SQL-update or SQL-insert command, only some index pages and some pages containing the inserted and updated data have to be written.

The method 500 is especially beneficial for incremental update when: (1) the number of read pages correlates to the amount of data requested by the application; and (2) the number of changed pages correlates to the amount of data changed by the application or compiler. As these two conditions especially hold for data managed in a relational database, the approach is especially beneficial for updating an NDS database, which is based on SQLite.

While the method 500 described how to perform an incremental update on the client database 112, the server database 102 may also be updated in an incremental manner. In this example, the client application module 116 is a database compiler located on a server. The server interface 104 receives the FileID and the (probably new) FileBaseVersionID from the database compiler. The server interface 104 then reads/writes pages according to these two parameters from/to the page server 100. The page access module 114 does not necessarily need a local version of the file but can work directly on the pages stored in the server database 102.

If the server interface 104 writes page 0 and this page does not exist for this FileID and FileBaseVersionID, e.g., in the case of a completely new compilation, then the FileIncrementalTransactionID is set to 1. In the case of incremental updating, the server interface 104 reads the pages from the server database 102 and, if it has to write a new page to the server database 102, the server interface 104 writes the new page with the new increased FileIncrementalTransactionID. Note that an incremental compilation is done within one transaction. All pages changed within this transaction receive the same FileIncrementalTransactionID. Thus, a client 110 can always download a consistent set of pages.

The method 500 also works for hybrid navigation systems. A hybrid navigation system includes an on-board portion and an off-board portion. The on-board portion is fully functional, i.e., the on-board portion includes the hardware and software that is located in a standalone on-board navigation system. In contrast to the standalone on-board navigation system, the hybrid navigation system contains a subset of the pages belonging to the database file and a wireless communications link to access additional off-board data. The hybrid navigation system is beneficial when the system has limited memory space.

If a page is not locally available, the hybrid navigation system requests the page from the page server 100. Assume that the FileIncrementalTransactionID is n and the page server 100 has two different pages with the page versions of n+3 and n−2. The page server delivers the page with the version n−2 to the hybrid navigation system, which is in sync with the other pages in the hybrid navigation system's local database.

If the hybrid navigation system does not have a database file locally and access to the page server is not available due to communication problems, the page access module 114 passes a file error to the application requesting the file. The application can handle these errors without crashing. The application may request the file later when a network connection becomes available.

At start up, the hybrid navigation system may send its FileID, FileBaseVersionID, and FileIncrementalTransactionID to the page server 100 asking whether a newer FileBaseVersionID or a newer FileIncrementalTransactionID exists. If a new FileBaseVersionID exists, all previously downloaded pages are downloaded again and stored in the local file system. If a new FileIncrementalTransactionID exists, only those pages with higher PageID than the local FileIncrementalTransactionID are downloaded.

An interesting feature of a hybrid navigation system is the selective pre-loading of the pages via SQL. If a navigation application executes a command, such as "SELECT*FROM POIs NATURAL JOIN POIAttribute WHERE CATID=27" or "SELECT*FROM RoutingTileTable WHERE ID BETWEEN 12345 and 56768," the hybrid navigation system receives the pages containing the relevant data. Thus, it is possible to trigger selective pre-loading of pages via SQL tailor-made for certain users and/or use cases.

Figure 6:
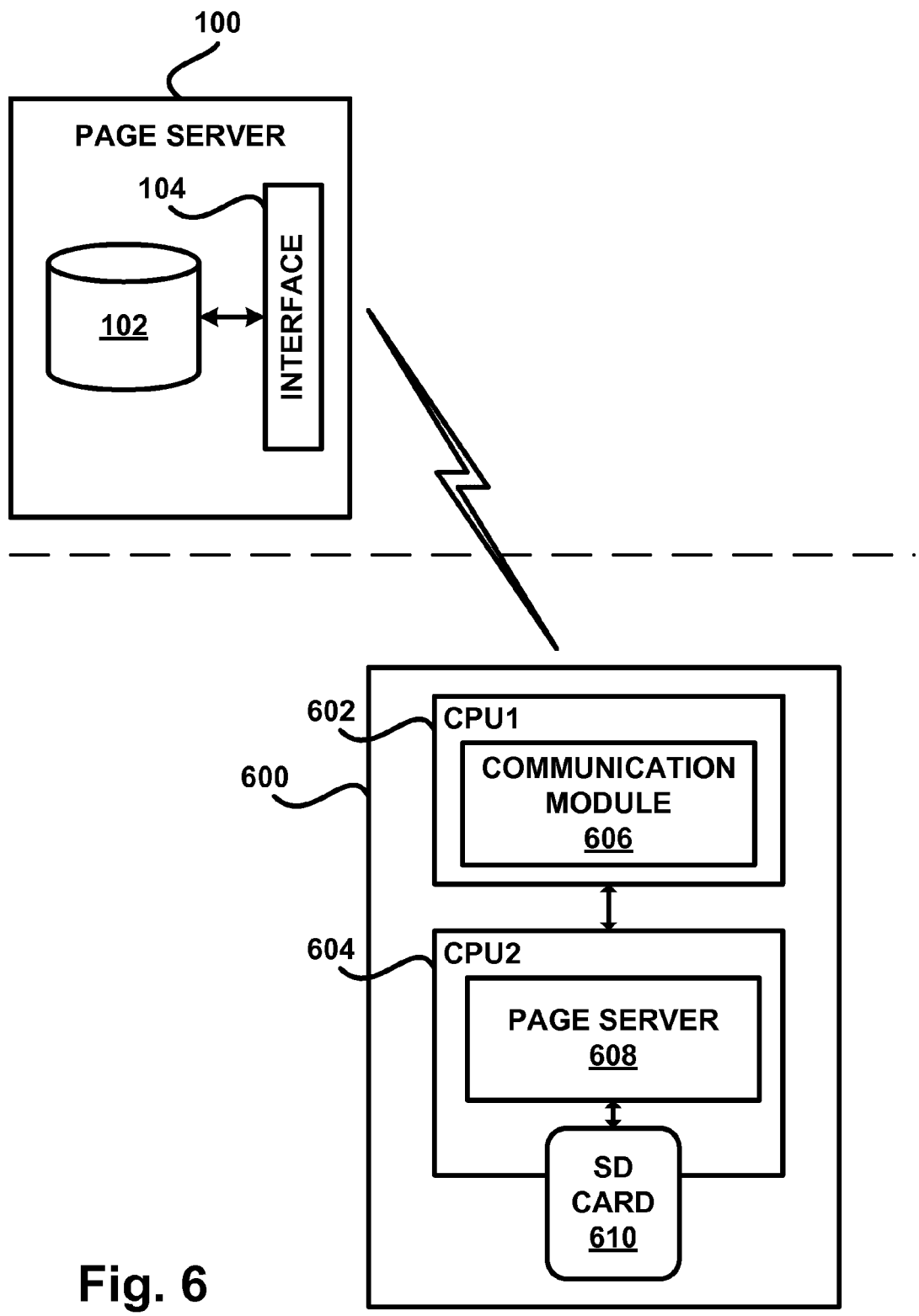
FIG. 6 is a block diagram of a platform having limited hardware using the page server depicted in FIG. 1, according to an example.

The method 500 may be especially useful for systems having very limited hardware. For example, FIG. 6 shows a platform 600 that includes two central processing units (CPUs) 602, 604. For example, the platform 600 may be a telematics platform, a map positioning engine, or other hardware-limited device located within a vehicle that uses map data. For purposes of the following description, both of the CPUs 602, 604 are too weak to run the light-weight SQLite engine.

The first CPU (CPU1) 602 has a communications module 606 that facilitates wireless access to systems external from the platform 600. FIG. 6 depicts that the communication module 606 allows the platform 600 to communicate with the page server 100. The dashed line in FIG. 6 separates systems located within the vehicle (below the line) and systems outside the vehicle (above the line).

The second CPU (CPU2) 604 runs a process for serving pages via a page server 608. The page server 608 is a simplified version of the page server 100. For example, the server database 102 in the page server 100 may be a powerful Oracle server containing the versioned pages, while the local database in the page server 608 may consist of concatenated pages in one long file. The CPU2 604 has access to a secure digital (SD) card 610 and other components within the vehicle.

The CPU1 602 synchronizes read and write operations to the navigational database stored in the SD card 610. The CPU1 602 communicates with the page server 100 outside the vehicle and the page server 608 within the vehicle. The data within the page server 100 typically has more current data than the data within the page server 608.

To perform a map update, the CPU1 602 requests the FileID, FileBaseVersionID, and FileIncrementalTransactionID of the database stored on the SD card 610 managed by the CPU2 604. The CPU1 602 queries the page server 100 for up-to-date pages. If there is new data, the page server 100 sends the pages to the communication module 606, which then provides the pages to the CPU2 604. The CPU2 604 stores the pages on the SD card 610. After all pages of this transaction are stored on the SD card 610, the CPU2 604 can offer this updated map data to other components within the vehicle.

It is intended that the foregoing detailed description be regarded as illustrative rather than limiting and that the following claims including all equivalents define the scope of the invention. For example, while the description provided examples using SQL and SQLite, it is understood that other languages and database management systems may be used. The claims should not be read as limited to the described order or elements unless stated to that effect. Therefore, all embodiments that come within the scope and spirit of the following claims and equivalents thereto are claimed as the invention.

We claim:

1. A method comprising:
   identifying, using a processor, a request for data from at least one navigation application;
   sending, by the processor, a request for generic data containers including a version number to a server in response to the request for data from at least one navigation application, wherein the generic data containers are configured for multiple data types; and
   receiving, by the processor, one or more generic data containers from the server based on the version number, wherein the one or more generic data containers have a predetermined size, and wherein the predetermined size is independent of the request for data and the at least one navigation application.

2. The method of claim 1, further comprising:
   receiving an empty result set when the version number indicates that no new version is stored at the page server; and
   providing locally stored data in response to the empty result set.

3. The method of claim 1, further comprising:
   receiving a list of page identifiers that have been updated; and
   sending a download request based on the list of page identifiers that have been updated and the request for data from the at least one application.

4. The method of claim 1, wherein the request for generic data containers is associated with a file including an incremental transaction identifier.

5. The method of claim 4, wherein a change to the file triggers an increase in the incremental transaction identifier.

6. The method of claim 4, wherein each of the one or more generic data containers are associated with a page identifier.

7. The method of claim 1, wherein the multiple data types include points of interest data, next valid character tree data, or traffic message channel data.

8. The method of claim 1, further comprising:
storing data from the one or more generic data containers as part of a partial map database of a hybrid navigation system.

9. The method of claim 8, further comprising:
determining whether the requested data is locally available in the partial map database prior to sending the request for generic data containers to the page server and sending the request for generic data containers only if the requested data is not locally available in the partial map database.

10. An apparatus comprising:
a local database; and
a page access device configured to identify a plurality of requests for data, wherein the plurality of requests specify multiple data types for one or more navigation applications associated with the local database, and configured to send a request for generic data containers including a version number to a server; and
a communications device configured to receive one or more generic data containers from the server based on the version number, wherein the one or more generic data containers have a predetermined size, and wherein the predetermined size is independent of the multiple data types from the plurality of requests for data.

11. The apparatus of claim 10, wherein the request for generic data containers is associated with a file including an incremental transaction identifier.

12. The apparatus of claim 11, wherein a change to the file triggers an increase in the incremental transaction identifier.

13. The apparatus of claim 11, wherein each of the one or more generic data containers is associated with a page identifier.

14. The apparatus of claim 10, wherein the multiple data types include points of interest data, next valid character tree data, or traffic message channel data.

15. The apparatus of claim 10, wherein the local database is a partial map database of a hybrid navigation system.

16. A method comprising:
storing, by a page server, pages of navigation data and associated version information, wherein the pages have an equal predetermined data size;
receiving, by the page server, requests including version information from a client;
accessing, by the page server, one or more of the pages of navigation data in response to the version information; and
transmitting, b the e server, the pages of navigation data and a file transaction identifier to the client.

17. The method of claim 16, wherein the pages of the equal predetermined data size include data for a digital map and data for a music application.

18. The method of claim 16, wherein the pages of the equal predetermined data size include points of interest data, next valid character tree data, or traffic message channel data.

* * * * *

UNITED STATES PATENT AND TRADEMARK OFFICE
CERTIFICATE OF CORRECTION

PATENT NO. : 9,160,817 B2  
APPLICATION NO. : 14/025439  
DATED : October 13, 2015  
INVENTOR(S) : Jan Richter et al.

Page 1 of 1

It is certified that error appears in the above-identified patent and that said Letters Patent is hereby corrected as shown below:

In the claims

In Claim 16:
Column 12, Line 21 – "b the e server" should be replaced with -- by the page server --.

Signed and Sealed this
Ninth Day of August, 2016

Michelle K. Lee
*Director of the United States Patent and Trademark Office*